Figure 1:
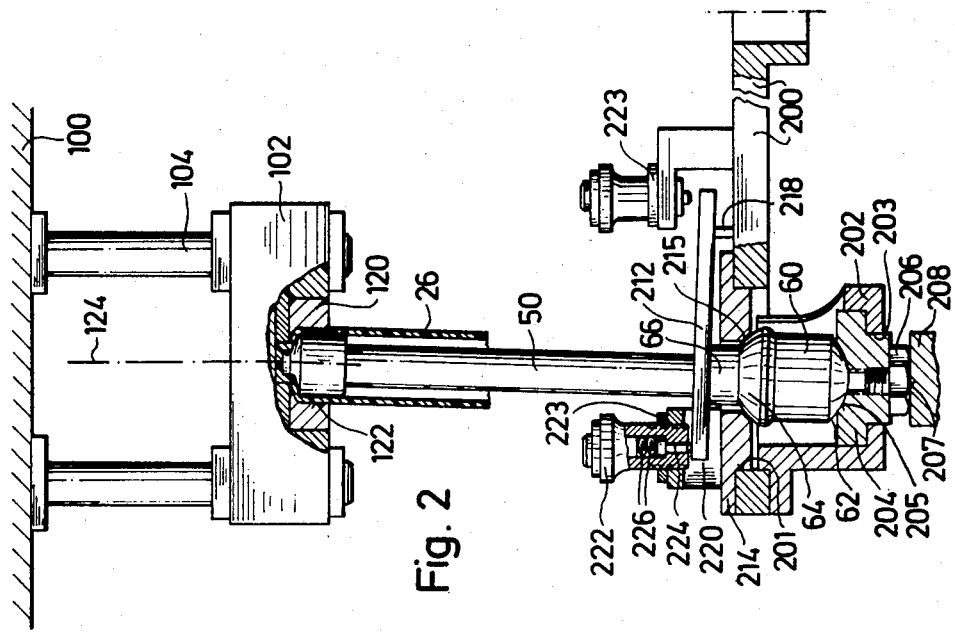

United States Patent [19]

Magerle

[11] 3,711,230
[45] Jan. 16, 1973

[54] MACHINE FOR PRODUCING HOLLOW BODIES OF PLASTICS MATERIAL

[75] Inventor: Karl Magerle, 8700 Kusnacht, Switzerland

[73] Assignee: Tubmatic Inter AG, Zug, Switzerland

[22] Filed: Aug. 17, 1971

[21] Appl. No.: 172,502

[30] Foreign Application Priority Data

Aug. 21, 1970 Switzerland.................12521/70

[52] U.S. Cl...............425/126, 264/320, 425/393, 425/399
[51] Int. Cl. ............................................B29d 23/00
[58] Field of Search......425/126, 127, 393, 399, 138; 264/320

[56] References Cited

UNITED STATES PATENTS

| | | | |
|---|---|---|---|
| 2,519,975 | 8/1950 | Moses | 264/320 X |
| 2,678,471 | 5/1954 | Barton | 264/320 X |
| 2,878,513 | 3/1959 | Slaughter | 264/320 UX |
| 3,185,558 | 5/1965 | Wilcock | 264/320 X |
| 3,498,865 | 3/1970 | Ogle | 264/320 X |

*Primary Examiner*—Robert L. Spicer, Jr.
*Attorney*—Cushman, Darby & Cushman

[57] ABSTRACT

A machine for producing hollow bodies of plastics material, comprising: a turntable which has a plurality of mandrels distributed in the peripheral direction, at least one working unit which cooperates with one mandrel at a time in a predetermined rotational position of the turntable and which is adapted to move substantially parallel to said mandrel, each mandrel having an end portion which is provided with spherical surfaces and which engages and is swivellable in a bearing part fastened on the turntable, aligning means associated with each mandrel in order to adjust the latter to a predetermined swivelled position, and resiliently elastic restoring means which counteract the deflection of the mandrel from the predetermined swivelled position.

6 Claims, 2 Drawing Figures

MACHINE FOR PRODUCING HOLLOW BODIES OF PLASTICS MATERIAL

The present invention relates to a machine for producing hollow bodies of plastics material, with a turntable which has a plurality of mandrels distributed in the peripheral direction, and further with at least one working unit which cooperates with one mandrel at a time in a predetermined rotational position of the turntable and is adapted to move substantially parallel to said mandrel.

Machines of this type are already known in which the working unit is for example formed by a vertically movable mould cavity which cooperates in succession with each of the mandrels on the turntable. During the downward movement of the cavity the open bottom end of the latter engages over the mandrel, the latter thus closing the mould cavity, optionally with a tubular portion of plastics material mounted on the mandrel.

In machines of this kind one problem comprises the centring of the mandrel situated in the working position at a given moment, in relation to the working unit, for example in relation to the mould cavity. It has been found that it is practically impossible for all the mandrels to be brought to the predetermined working position or for the turntable to be stopped in a position in which the appertaining mandrel is aligned to the working unit with sufficient accuracy.

The aim of the invention is now to provide a machine in which detrimental consequences of inaccurate alignment between mandrel and working unit can be avoided within certain limits. To this end the invention is based on the realization that in many cases cooperation between working unit and mandrel does not require coaxiality but merely concentricity in a determined cross-section of the mandrel and working unit.

The machine according to the invention for producing hollow bodies of plastics material is now characterized in that each mandrel has an end portion which is provided with spherical surfaces and which engages and is swivellable in a bearing part fastened on the turntable, and that aligning means are associated with each mandrel for the purpose of adjusting the latter to a predetermined swivelled position, while resilient elastic return means are provided which counteract the deflection of the mandrel from the predetermined swivelled position.

In consequence of the articulated mounting of the mandrels at one end, they can adjust themselves at their free end to the relative position in relation to the working unit, or as the result of suitable construction of a part of the working unit can be adjusted by their free end to a predetermined position. The restoring means have the effect that after being released by the working unit the mandrel returns to its starting position in order either to remain there until next engaged by the same working unit or to be deflected out of said starting position by another working unit.

An example of construction of the machine according to the invention is illustrated in the drawing, in which:

FIG. 1 is a vertical section through a part of the machine, and

Figure 2:
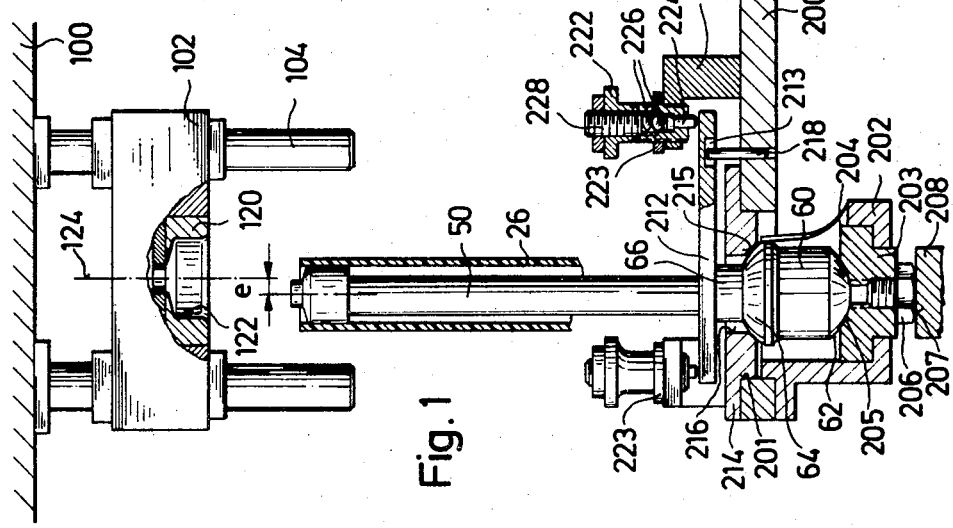

FIG. 2 a section corresponding to FIG. 1, with the parts in a different position.

In the drawing 100 designates a machine frame which is provided with a working unit 102 in the form of a tool holder. The working unit 102 is slidable on vertical guide rods 104 with the aid of means which are not illustrated and contains a mould cavity 120 with a substantially cylindrical impression 122. The axis of the mould cavity is designated 124.

The machine frame carries a turntable which is adapted to be turned stepwise by means that are not illustrated and with the aid of a vertical shaft. In a predetermined pitch corresponding to the size of a movement step of the turntable there are disposed on the latter, in a manner described more fully below, a plurality of mandrels which assume a generally perpendicular position in relation to the table surface. In the example of embodiment illustrated the mandrels 50 are intended to receive tubular sleeves of plastics material, on which head parts of plasticized plastics material are pressed or welded in the cavity 120.

The mounting of a single mandrel on the turntable 200 is described below. Corresponding to the pitch of the mandrels 50 the turntable 200 is provided on its periphery with bores 201, a casing 202 fastened on the lower face of the turntable 200 engaging in each bore. The casing 202 contains a bottom joint socket 204 with a spherical surface 205. The bottom joint socket 204 extends through a bore 203 in the casing 202 and on its lower face carries a supporting screw 206 screwed into the bottom joint socket. The end face 207 of the screw 206 points downwards and adjoins a supporting segment 208 which is situated below the working station formed by the tool holder and is rigidly joined to the machine frame.

An upper joint socket 214, which has a spherical surface 215 and a bore 216 coaxial to the latter, engages in the bore 201 in the turntable 200. The upper joint socket 214 is likewise fastened on the turntable. The mandrel 50 is joined at its bottom end rigidly, but preferably detachably, to a joint body 60 which has spherical surfaces 62 and 64 cooperating with the spherical surfaces 205 and 215 of the joint sockets 204 and 214. On an extension 66 of the joint body, extending through the bore 216 in the upper joint socket 214, there is fastened an aligning plate 212 which has the general shape of an equilateral triangle and on its lower face is provided with a recess 213. A pin 218 mounted in the turntable 200 projects with clearance into the recess 213 and prevents the aligning plate 212 from turning.

On the upper face of the turntable 200 there are rigidly fastened three carriers 220 (only two carriers are shown in the drawing), which are disposed on a circle the center of which lies on the axis of the bore 216, the carriers being offset by 120° in each case on the periphery of the circle. In each carrier there is screwed an aligning sleeve 222, which can be locked with the aid of a lock-nut 223. An adjusting screw 228 is screwed into the aligning sleeve 222 and presses against two rubber balls 226 disposed in the aligning sleeve, the bottom rubber ball being supported on a bolt 224. The bolt 224 of the aligning sleeves 222 are intended to cooperate with the aligning plate in order to determine the position of the latter and consequently of the mandrel 50. As illustrated with great exaggeration in FIG. 1, when the turntable 200 is turned into the position corresponding to the working unit 102 the mandrel 50 may have its axis spaced apart from or offset in relation to the axis of the cavity 120 by the amount of the distance e. The abovedescribed mounting of the mandrel 50 now enables the latter to deflect when during the downward movement of the tool holder 102 the cavity 120 comes into engagement with its top end. Against the action of the rubber balls 226 in one or more of the aligning sleeves 222 the mandrel 50 is thus adjusted to the center of the cavity.

This position is illustrated in FIG. 2, where the upper part of the mandrel is entirely in engagement with the cavity 120, which at its bottom end is closed by the mandrel and the plastics tube 26, in order to mould a headpiece of plasticized plastics material on said plastics tube. Under the action of pressing pressure prevailing in the cavity a downwardly directed force is applied through the mandrel 50 and the articulated element 212 to the casing 202 and hence to the turntable 200, which under the action of this force deflects to a slight extent so that the surface 207 of the screw 206 comes to bear against the supporting segment 208. In this position the supporting segment 208 applies to the articulated element 212, by way of the screw 206 and the joint socket 204 which is axially slidable in the casing 202, a clamping force which locks the mandrel in its axial position with increasing intensity, the greater the pressing pressure in the cavity.

While for the sake of greater clarity it was assumed in the drawing that the axis of the mandrel 50 and the axis of the cavity 120 are offset in a direction which is approximately radial to the turntable, it is obvious that the mounting described is also able to compensate in the manner described for offsetting of the two axes in question in the peripheral direction of the turntable. Such offsetting moreover occurs more frequently in practice, since it is relatively difficult to stop the turntable in predetermined peripheral positions with the necessary accuracy.

When the tool holder 102 together with the cavity 120 moves upwards again, so that the latter frees the top of the mandrel and the tube 26, the mandrel 50 can be swivelled back to the starting position shown in FIG. 1 under the action of the rubber balls 226.

While the adjustment of the sleeves 222 in the carriers 220 enables the path of the pin 224 to be varied, by adjustment of the screw 228 the pressure applied by the rubber balls 226 to the pin 224 can be varied independently thereof. The engagement of the pin 218 in the recess 213 in the aligning plate 212 prevents the triangular aligning plate from turning out of the position in which its corners are situated under the pin 224. In consequence of the play between the pin 218 and the recess 213 however the necessary freedom of movement of the aligning plate in conjunction with the deflection of the mandrel 50 is ensured.

What is claimed is:

1. A machine for producing hollow bodies of plastics material, comprising: a turntable which has a plurality of mandrels distributed in the peripheral direction, at least one working unit which cooperates with one mandrel at a time in a predetermined rotational position of the turntable and which is adapted to move substantially parallel to said mandrel, each mandrel having an end portion which is provided with spherical surfaces and which engages and is swivellable in a bearing part fastened on the turntable, aligning means associated with each mandrel in order to adjust the latter to a predetermined swivelled position, and resiliently elastic restoring means which counteract the deflection of the mandrel from the predetermined swivelled position.

2. A machine according to claim 1, characterized in that locking means are provided for each end part of each mandrel in order to lock said part under the action of a force acting in the direction of its axis.

3. A machine according to claim 2, characterized in that the end part is disposed between two joint sockets, the end part extending through one joint socket and the other joint socket being axially movable.

4. A machine according to claim 3, characterized in that the other joint socket is disposed in a casing and is intended for cooperating with a supporting segment with the aid of an extension projecting out of the casing.

5. A machine according to claim 3, characterized in that the end part is rigidly joined to an aligning plate acted on by resiliently elastic elements which are distributed over the periphery of the aligning plate.

6. A machine according to claim 5, characterized in that three aligning sleeves, distributed around each aligning plate, are disposed on the turntable, each aligning sleeve containing a pin and also two rubber balls, the latter being pressed by a screw against the pin.

* * * * *